(12) United States Patent
Westfechtel et al.

(10) Patent No.: US 6,566,563 B1
(45) Date of Patent: May 20, 2003

(54) METHOD FOR PRODUCING COMPOUNDS WITH TERMINAL OH GROUPS

(75) Inventors: Alfred Westfechtel, Hilden (DE); Roland Gruetzmacher, Wuelfrath (DE); Elke Grundt, Duesseldorf (DE)

(73) Assignee: Cognis Deutschland GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/720,890

(22) PCT Filed: Jun. 23, 1999

(86) PCT No.: PCT/EP99/04351
§ 371 (c)(1),
(2), (4) Date: May 4, 2001

(87) PCT Pub. No.: WO00/01755
PCT Pub. Date: Jan. 13, 2000

(30) Foreign Application Priority Data

Jul. 2, 1998 (DE) .......................................... 198 29 593

(51) Int. Cl.⁷ .......................... C07C 31/18; C07C 43/11; C07C 43/18; C07C 43/20; C07C 69/34; C07C 69/52; C07C 67/00

(52) U.S. Cl. ...................... 568/852; 560/190; 560/198; 560/202; 568/617; 568/618; 568/619

(58) Field of Search ................................. 525/467, 460; 528/370, 368, 372, 481, 85, 500, 76; 568/852, 617, 618, 619; 560/190, 198, 202

(56) References Cited

U.S. PATENT DOCUMENTS

| | | |
|---|---|---|
| 4,463,141 A | 7/1984 | Robinson |
| 4,891,421 A | 1/1990 | Nishimura et al. |
| 5,137,935 A | 8/1992 | Bott et al. |

FOREIGN PATENT DOCUMENTS

| | | |
|---|---|---|
| EP | 0 335 416 | 10/1989 |
| EP | 0 442 402 | 8/1991 |
| EP | 0 798 327 | 10/1997 |
| EP | 0 798 328 | 10/1997 |
| JP | 62 187725 | 8/1987 |
| JP | 05 239201 | 9/1993 |

OTHER PUBLICATIONS

G. Oertel, *Kunststoff–Handbuch–7.Polyurethane*, 3. Aufl. 1993. pp. 455–467, 508, 510–512.

A.G. Hinze, *Die Herstellung von Dimerfettsaeuren aus ungesaettigten Fettsaeuren*, Fette und Oele 26, 1994, pp. 47–51.

L.S. Newton, *Dimer Acids and their Derivatives–Potential Applications*, Speciality Chemicals, 1984, pp. 17, 18, 22–24.

Von P. Daute, *Hydrolysestabile fettchemische Polyole fuer Polyurethanan wendungen*, Fat Science Tech., 95 (1993), Nr. 3, pp. 91–94.

*Primary Examiner*—Samuel Barts
*Assistant Examiner*—Elvis O. Price
(74) *Attorney, Agent, or Firm*—John E. Drach; Steven J. Trzaska

(57) ABSTRACT

A process for making OH-terminated compounds involving: (a) combining at least one $CH_2OH$-terminated diol and a titanium-containing catalyst to form a reaction mixture; (b) heating the reaction mixture to a temperature of from 110 to 160° C. to form a heated reaction mixture; (c) continuously adding dimethyl carbonate to the heated reaction mixture; (d) continuously distilling all methanol released from the heated reaction mixture; (e) heating the reaction mixture to a temperature of from 190 to 240° C. to form an OH-terminated product; (f) removing unreleased methanol and dimethyl carbonate from the reaction mixture under a pressure of less than 100 mbar; and (g) deactivating the titanium-containing catalyst by adding from 0.8 to 2 equivalents, based on the catalyst, of a 1 to 20% by weight aqueous solution of phosphoric acid to the reaction mixture, at a temperature of from 80 to 120° C.

6 Claims, No Drawings

METHOD FOR PRODUCING COMPOUNDS WITH TERMINAL OH GROUPS

This application is a 371 of PCT/EP99/04351, filed Jun. 23, 1999.

BACKGROUND OF THE INVENTION

This invention relates to a process for the production of OH-terminated compounds in which $CH_2OH$-terminated diols are reacted with dimethyl carbonate in the presence of a catalyst, the methanol released is continuously distilled off and the catalyst used is then deactivated. Through the choice of special process and material parameters, the products formed are eminently suitable for the production of linear polyurethanes by virtue of their property profile.

Polyurethanes (PURs) are a very broad group of polymers differing widely in their composition and in their property profiles. One feature common to all polyurethanes is the principle on which they are synthesized, i.e. they are produced by the diisocyanate polyaddition process. These compounds are all characterized by urethane groups —NH—CO—O— which are formed by polyaddition of hydroxy compounds, generally diols or polyols, onto the —NCO groups of difunctional or polyfunctional isocyanates. In most cases, the urethane group links polyalkylene ether and/or polyester sequences which have molecular weights of about 200 to 6,000. Polyurethanes are commercially available, for example, as foams, thermoplastic granules, solutions, aqueous dispersions and in the form of prepolymers.

The following products, for example, are produced from polyurethanes: highly elastic foams (mattresses, cushions, auto seats), rigid foams (insulating materials), rigid and flexible moldings with a compact outer skin (window frames, housings, skis, auto fenders, hood and trunk parts, steering wheels, shoe soles), industrial moldings combining high elasticity and rigidity, ski boots, films, blow moldings, auto fenders, printing rolls, paints, adhesives, textile coatings, high-gloss paper coatings, leather finishes, elastomer filaments, wool finishes, etc. The number and scope of applications is constantly increasing. Numerous reference books and articles are available on the production, properties, technology and applications of polyurethanes, cf. for example Gerhard W. Becker (Ed.), "Kunststoff-Handbuch—7. Polyurethane" 3rd Edition 1993, pages 455–467 and 508 and 510–512.

So-called linear polyurethanes have recently assumed particular significance. Compounds belonging to this group can be obtained by reacting $CH_2OH$-terminated diols with diisocyanates to form substantially linear polyurethanes. Among the most attractive $CH_2OH$-terminated compounds used for the production of linear polyurethanes are polycarbonate copolyether diols and/or polycarbonate copolyester diols. These are compounds which are normally obtained by reacting such compounds as phosgene, diphenyl carbonate, dimethyl carbonate and the like with diols, such as diethylene glycol, triethylene glycol, tetraethylene glycol, hexane-1,6-diol, polyethylene glycol, dipropylene glycol, tripropylene glycol, polypropylene glycol, polytetrahydrofuran and the like or ethylene oxide or propylene oxide adducts thereof.

U.S. Pat. No. 4,463,141 relates to polyether carbonate diols which can be obtained by linking structural units of poly(tetramethylene-ether)glycol with a dialkyl carbonate, a cyclic carbonate or phosgene. So far as the use of dialkyl carbonates as a structural unit in the synthesis of the required diol is concerned, it is stated that dimethyl and diethyl carbonate are preferred. The reactions are carried out in the presence of typical transesterification catalysts, preferably tetrabutyl titanate. So far as the reaction parameters are concerned, it is stated that the reaction is normally carried out at temperatures of 120 to 240° C. and at atmospheric pressure. More particularly, the carbonate is slowly added to the glycol used as starting material over a period of 5 to 20 hours. According to the teaching of U.S. Pat. No. 4,463,141, the alcohol formed as secondary product during the reaction can be removed either by evaporation or by purging the reaction zone with nitrogen. According to the teaching of U.S. Pat. No. 4,463,141, the diol to be produced is adjusted to the required molecular weight by continuously removing samples from the reaction zone during the reaction and analyzing them and deactivating the catalyst by standard methods, more particularly by addition of phosphoric acid, at the time the required molecular weight is reached. The best embodiment disclosed in U.S. Pat. No. 4,463,141 is in Example 1 which describes the reaction of a polytetrahydrofuran having a molecular weight of 650 with diethyl carbonate in the presence of tetrabutyl titanate. The mixture is heated at a temperature of 210 to 240° C. (the values are based on atmospheric pressure) and the ethanol formed during the reaction is removed by distillation. On completion of the reaction, the catalyst is deactivated by addition of 85% phosphoric acid.

European patent application EP-A-335 416 relates to modified polyoxytetramethylene glycols with a low melting point and high resistance levels and to a process for their production. This application relates in particular to modified polyoxytetramethylene glycols which have a main chain with recurring structural elements, the structural elements in question being on the one hand a polyoxytetramethylene group with the formula —$[O(CH_2)_4]_n$—, where n is a number of 3 to 28, and a dioxycarbonyl group, the first structural element mentioned making up from 75.5 to 99.3 mole-% and the second structural element making up from 24.5 to 0.7 mole-%.

European patent application EP-A-442 402 relates to polyether polycarbonate diols essentially made up of (a) 3 to 63.7 mole-% of units derived from polyoxytetramethylene diol, (b) 63.7 to 3 mole-% of units which are derived from a polyoxyalkylene diol different from a) and which contain $C_{2-8}$ alkylene groups, an aliphatic alkanediol containing 2 to 14 carbon atoms, an alicyclic alkanediol containing 3 to 14 carbon atoms or an alkylene oxide containing 2 or 3 carbon atoms or mixtures thereof and (c) 33.3 to 50 mole-% of units derived from phosgene, a dialkyl carbonate containing $C_{2-4}$alkyl groups, a cyclic carbonate containing $C_{2-4}$ alkylene groups or mixtures thereof.

European patent application EP-A-798 327 relates to a two-stage process for the production of polycarbonate copolyether diols. The process is essentially carried out as follows: in a first stage, one or more diols (polyether glycols, PEGs) is/are reacted with dimethyl carbonate at temperatures of 90 to 120° C. in the presence of a basic catalyst selected from the group consisting of oxides, hydroxides, carbonates or alcoholates of an alkali metal or alkaline earth metal (for example sodium methylate). The molar ratio of dimethyl carbonate to PEG selected for the reaction is between 2 and 12:1, i.e. dimethyl carbonate is used in excess. In a second stage, the intermediate product obtained—after the catalyst used in the first stage and the excess dimethyl carbonate used have been removed—is converted into the end product by reaction with the required polyether glycol at 140 to 185° C./atmospheric pressure in the presence of a solvent and an organometallic catalyst which is selected from tin, lead, titanium, zirconium and antimony compounds and which is used in concentrations of 0.0001 to 0.001% by weight. This second reaction step is a typical transesterification reaction in which the terminal methoxy groups of the intermediate product are replaced by terminal PEG groups.

According to page 5, lines 43–44 of EP-A-798 327, the catalyst used in the second stage is neutralized. This is done either by hydrothermal treatment or by using a reagent which is capable of binding the metal ions of the catalyst. In the second case, it is specifically stated in lines 48 to 50 that organic acids or mineral acids, such as phosphoric acid or polyphosphoric acid, are particularly suitable. However, there is no reference in EP-A-798 327 to any particular form of presentation or supply of the acid used to deactivate the catalyst.

EP-A-798 328 describes a process for the production of polycarbonate copolyether polyols. This known process is a single-stage process of which the main parameters are as follows:

1) use of dimethyl carbonate (DMC)
2) use of one or more polyether diols
3) use of one or more polyether diols with MW=100 to 200
4) molar ratio of dimethyl carbonate to polyether diols= 0.5 to 1.35
5) temperature=130 to 185° C.
6) catalyst=alkali metal or alkaline earth metal oxide, carbonate or alcoholate or transition metal compound (metal of the third to fifth groups), component 3) being part of component 2) and the reaction preferably being carried out in three successive "phases" which correspond to different pressure conditions.

DESCRIPTION OF THE INVENTION

The problem addressed by the present invention was to provide an improved process for the production of OH-terminated compounds which would be suitable for the production of linear polyurethanes and which would provide these polyurethanes with a favorable property profile. By this is meant in particular that these OH-terminated compounds would be distinguished in the gel time test described below by the fact that measured value G2 differs from the measured value G1 by at most 20%, based on the measured value G1, which means that the polyurethanes produced by reaction of these compounds with diisocyanates are substantially linear, i.e. have only a few branches.

The present invention relates to a process for the production of OH-terminated compounds in which $CH_2OH$-terminated diols are reacted with dimethyl carbonate in the presence of a catalyst, the methanol released is continuously distilled off and the catalyst used is then deactivated. The process is characterized in that a) one or more $CH_2OH$-terminated diols is/are initially introduced into a reactor together with a titanium-containing catalyst and the resulting mixture is heated to a temperature of 110 to 160° C.,
b) dimethyl carbonate is continuously added at that temperature, a molar ratio of dimethyl carbonate to diol(s) of 1.01:1 to 5:1 being adjusted, and
c) the methanol released during the reaction is continuously distilled off, a molar ratio of methanol to dimethyl carbonate of 0.5:1 to 99:1 being established during distillation,
d) when no more methanol is released, the reaction mixture is heated to a temperature of 190 to 240° C. and methanol/dimethyl carbonate is then removed at that temperature under a pressure below 100 mbar and
e) finally the catalyst is deactivated by addition of 0.8 to 2 equivalents of phosphoric acid—based on the catalyst used—at a temperature of 80 to 120° C., the phosphoric acid being used in the form of a 1 to 20% by weight aqueous solution.

In one embodiment of the process according to the invention, more diol—the same as in a)—is added immediately after step d) and before step e) in a molar quantity which is calculated on the basis of the required OH value to be adjusted in the end product and a further transesterification is carried out at a temperature of 160° C. to 240° C. This step, which is integrated into the process according to the invention immediately after step d) and before step e), is referred to as step *).

Steps a) to d), *) and e) of the process according to the invention are schematized once more in the following Table.

In the process according to the invention, the catalyst used in step a) remains in the product and is deactivated in step e). This deactivation is permanent. This means that the catalyst is no longer reactivated, even in the event of prolonged exposure of the product to heat. This ensures that, when the product is subsequently used for the production of polyurethanes, particularly linear polyurethanes, the permanently deactivated catalyst does not cause any unwanted crosslinking or secondary reactions. A measure of the permanence of deactivation of the catalyst is the gel time test described in more detail hereinafter. The products obtainable by the process according to the invention are distinguished by the fact that, in the gel time test, the measured value G2 differs from the measured value G1 by a maximum of 20%, based on the measured value G1.

It is specifically pointed out that the values for G1 and G2 are only measured over a range of up to 300 minutes. If values exceeding 300 minutes are obtained for G1 and/or G2, they are simply expressed as ">300 mins." In the case of values of ">300 mins.", the calculation of how large the percentage deviation of G2 is from G1 is always based on 300 mins.

One or more $CH_2OH$-terminated diols is/are used in the course of the process according to the invention. In the interests of simplicity, the term "diols" is used hereinafter for these special compounds. There are basically no limits to the molecular weight of the diols. However, diols with an average molecular weight (number average; Mn) of 118 to 1,000 and more particularly in the range from 200 to 600 are preferred.

In one preferred embodiment, diols from the class of alkanediols, polyether diols and polyester diols are used.

The alkanediols are compounds corresponding to the general formula $HOCH_2—R^1—CH_2OH$, where $R^1$ is a hydrophobic hydrocarbon radical which may be saturated or unsaturated, linear or branched and may optionally contain aromatic structural elements. Examples are hexane-1,6-diol, heptane-1,7-diol and octane-1,8-diol, polyoxytetramethylenediols (also known as polytetrahydrofurans) and the so-called dimerdiols.

Dimerdiols are well-known commercially available compounds which are obtained, for example, by reduction of dimer fatty acid esters. The dimer fatty acids on which these dimer fatty acid esters are based are carboxylic acids which may be obtained by oligomerization of unsaturated carboxylic acids, generally fatty acids, such as oleic acid, linoleic acid, erucic acid and the like. The oligomerization is normally carried out at elevated temperature in the presence of a catalyst, for example of clay. The substances obtained—dimer fatty acids of technical quality—are mixtures in which the dimerization products predominate. However, small amounts of higher oligomers, more particularly the trimer fatty acids, are also present. Dimer fatty acids are commercially available products and are marketed in various compositions and qualities. Abundant literature is available on the subject of dimer fatty acids, cf. for example the following articles: Fette & Öle 26 (1994), pages 47–51; Speciality Chemicals 1984 (May Number), pages 17, 18, 22–24. Dimerdiols are well-known among experts, cf. for example a more recent article in which inter alia the production, structure and chemistry of the dimerdiols are discussed: Fat Sci. Technol. 95 (1993), No. 3, pages 91–94. According to the invention, preferred dimerdiols are those which have a dimer content of at least 70% and more particularly 90% and in which the number of carbon atoms per dimer molecule is mainly in the range from 36 to 44.

Polyetherdiols in the context of the present invention are diols corresponding to the general formula $HOCH_2$—$R^6$—$CH_2OH$, where $R^6$ is a hydrophobic hydrocarbon radical which may be saturated or unsaturated, linear or branched and may also contain aromatic structural elements and in which one or more $CH_2$ units must each be replaced by an oxygen atom.

A particularly attractive class of polyetherdiols can be obtained by alkoxylation of alkanediols, such as ethane-1,2-diol, propane-1,3-diol, propane-1,2-diol, butane-1,4-diol, butane-1,3-diol, pentane-1,5-diol, hexane-1,6-diol, heptane-1,7-diol and octane-1,8-diol, polyoxytetra-methylenediols (polytetrahydrofurans) and dimerdiols. The production of these alkoxylated diols is normally carried out as follows: in a first step, the required diol is contacted with ethylene oxide and/or propylene oxide and the resulting mixture is reacted in the presence of an alkaline catalyst at temperatures of 20 to 200° C. Addition products of ethylene oxide (EO) and/or propylene oxide (PO) onto the diol used are obtained in this way. The addition products are therefore EO adducts or PO adducts or EO/PO adducts with the particular diol; in the case of the EO/PO adducts, the addition of EO and PO may take place statistically or blockwise.

Polyesterdiols in the context of the invention are diols corresponding to the general formula $HOCH_2$—$R^3$—$CH_2OH$, where $R^3$ is a hydrophobic hydrocarbon radical which may be saturated or unsaturated, linear or branched and may also contain aromatic structural elements and in which one or more $CH_2$ units must each be replaced by a COO unit. They are normally produced by reacting difunctional polyols with dicarboxylic acids or anhydrides thereof. Commonly used polyols are ethylene glycol, propane-1,2-diol, butane-1,4-diol, hexane-1,6-diol. Typical dicarboxylic acids are succinic acid, adipic acid, phthalic anhydride. Hexane-1,6-diol adipic acid polyesters are particularly preferred.

Dimethyl carbonate is used in an excess over the diols. As already mentioned, a molar ratio of dimethyl carbonate to diol(s) of 1.01:1 to 5:1 is adjusted, a molar ratio in the range from 1.1:1 to 1.5:1 being preferred.

A titanium-containing compound is used as the catalyst. There are basically no limits to the chemical nature of the catalyst. Tetraalkyl orthotitanates and, more particularly, tetrabutyl orthotitanate are preferably used as catalyst. The catalyst is preferably used in a quantity of 20 to 2,000 ppm. The ppm figure is understood to be ppm of titanium, based on the total quantity of diol(s) and dimethyl carbonate used in steps a) and b).

The temperature mentioned in step d) is preferably adjusted to a value in the range from 195 to 210° C. In general, step d) is carried out at the pressure spontaneously established. However, it may even be desirable to reduce the pressure, preferably to a value below 100 mbar.

In one embodiment of the process according to the invention, step *) is carried out immediately after step d) and before step e), as already mentioned. This step *) allows the exact and reproducible adjustment of the hydroxyl value (OH value) of the end product to a desired value. This is particularly important because control of the reaction is not normally so precise that a required narrow specification in regard to the OH value is achieved. However, safely establishing an exact OH value is very important for the use of the product produced by the process according to the invention for linear polyurethanes because the property profile of the polyurethanes thus obtainable can be carefully controlled in this way. In practice, this is done by removing a sample from the reaction mixture on completion of steps a) to d), determining its OH value (for example by the conventional DGF C-V 17a method of by indirect methods, such as NIR spectroscopy or viscosity measurements), then calculating the difference between the measured OH value and the particular OH value required for the end product and, on the basis of this calculation, adding an additional precisely defined quantity of diol. These calculations are trivial stoichiometric calculations for the expert so that there is no need here to mention any particular calculation procedure.

The OH-terminated compounds produced in accordance with the invention are distinguished in particular by the fact that, when reacted with diisocyanates, they lead to polyurethanes with a very high degree of linearity. This is demonstrated by measurement of the gel times.

To this end, the following gel time test is carried out. The polycarbonate diol produced in accordance with the invention to be subjected to the test is contacted with a polyisocyanate having a defined average NCO functionality of 2.0 to 2.5 (for example with polymer MDI of technical quality having an average NCO functionality of 2.3) in a molar ratio of 1:1.1 and then briefly and vigorously stirred with a wooden spatula. The mixture thus prepared is called the test mix. Two tests are then carried out with the test mix:

1. 100 g of test mix are introduced into a polyethylene-coated 200 ml cup of paper-based laminate which is then placed in a foam-filled mold for heat insulation. The gel time (in minutes) is then determined using a Techne "Gelation Timer". The result obtained is referred to as G1.
2. 100 g of test mix are heated for 30 minutes to 200° C. in a water jet vacuum. The sample thus heated is then placed in a polyethylene-coated 200 ml cup of paper-based laminate which is placed in a foam-filled mold for thermal insulation. The gel time (in minutes) is then determined with a Techne "Gelation Timer". The result obtained is referred to as G2.

In the gel time test, at least two different measurements are carried out to eliminate any statistical measured value variations of a sample in regard to the parameters G1 and G2 and the average values of G1 and G2 are calculated from those measurements. As mentioned above, the values for G1 and G2 are only measured over a range of up to 300 minutes; If values exceeding 300 minutes are obtained for G1 and/or G2, they are expressed simply as ">300 mins." In the case of values of ">300 mins.", the calculation of how large the percentage deviation of G2 is from G1 is always based on 300 mins.

The gel time test is one method of testing the permanence of catalyst deactivation carried out in step e) of the process according to the invention. The OH-terminated compounds obtainable by the process according to the invention are surprisingly distinguished in the gel time test just described by the fact that the measured value G2 differs from the measured value G1 by at most 20% and more particularly by at most 10%, based on the measured value G1. It has been found that the criterion mentioned, i.e. that the measured value G2 differs from the measured value G1 by at most 20%, is only achieved safely and to plan when the phosphoric acid used to deactivate the titanium-containing catalyst used is employed in the form of a 1 to 20% by weight and preferably 3 to 10% by weight aqueous solution and is used within the quantity limits indicated. Any deviation from this, i.e. if pure phosphoric acid or phosphoric acid with a concentration of more than 20% by weight in water is used or if the quantity limits indicated are exceeded, will result in greater deviations of the measured value G2 from the measured value G1 so that higher degrees of crosslinking and hence a lower degree of linearity of the polyurethane will be indicated (cf. the following Examples).

Accordingly, the present invention also relates to the use of the OH-terminated obtainable by the process according to the invention for the production of linear polyurethanes.

EXAMPLES

1. Methods

Hydroxyl value (OH value): DGF C-V 17a
Acid value (A value): DGF C-V 2
Viscosity: Brookfield viscosimeter, pure substance, spindle 21, 25° C.
Gel time values G1 and G2: determined by the gel time test described above; "Desmodur VL" (a polymer MDI of technical quality with an average NCO functionality of 2.3, a product of Bayer AG) was used as the polyisocyanate in the gel time test.

2. Abbreviations and Commercial Names

PolyTHF-250=polytetrahydroforan with an OH value of 479 (BASF)
Sovermol 908=dimer diol with an OH value of 205 (Henkel)

3. Production Examples

Example 1

918.0 kg (3920 moles) of PolyTHF-250 were introduced into a reactor together with 1.37 kg of tetrabutyl orthotitanate and heated to 140° C. in a very gentle stream of nitrogen. 440.0 kg (4885 moles) of dimethyl carbonate were then

| Sequence of steps in the process according to the invention | | |
|---|---|---|
| Key substances in the reactor | Step | Brief description of the step |
| HO—OH | a) | Diol(s) and catalyst are introduced first; T = 110–160° C. |
| 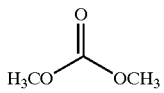 | b) | DMC is added |
|  | c) | Methanol released is (azeotropically) distilled off |
| 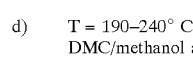 | d) | T = 190–240° C.; p < 100 mbar; DMC/methanol are distilled off |
| 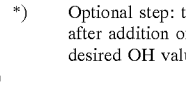 | *) | Optional step: transesterification after addition of diol to establish a desired OH value in the end product |
|  or  | e) | Catalyst deactivation by 1–20% $H_3PO_4$ |

Note: the left-hand column of this table is intended to schematize the key substances present in the reactor. These may be compounds used or products formed therefrom; the catalyst is not expressly shown in this column.

slowly added with stirring and at the same the methanol formed by the reaction at that temperature was distilled off. An ascending condenser heated to 50 to 60° C. was connected in between to separate methanol from unreacted dimethyl carbonate. The vapor temperature was regulated by the addition rate of the dimethyl carbonate and adjusted to a value of 63 to 65° C. The total quantity of dimethyl carbonate had been added after about 3.5 hours. The temperature of the reaction mixture was then kept at 140° C. for 0.5 hour and subsequently increased to 200° C. The reaction mixture was then distilled for 1 hour at 200° C., the vapor temperature falling distinctly. The quantity of distillate at this time was ca. 320 kg. Vacuum was then carefully applied and the remaining dimethyl carbonate (in all about 20 kg) was removed at 200° C./10–15 mbar. After cooling to 100° C., the vacuum was eliminated with nitrogen to remove a sample for the purpose of determining viscosity and OH value. The OH value was 44. More PolyTHF-250 was then added in a quantity of 28 kg, followed by transesterification for 0.5 hour at 200° C. Finally, to deactivate the titanium catalyst, 8.0 kg of a 5% by weight aqueous solution of phosphoric acid were added and the whole was stirred for 0.5 hour at 100° C. The product was finally dried in vacuo, giving ca. 1,000 kg of a cloudy, colorless to pale yellowish liquid.

Product parameters:
OH value=54
A value=0.2
Viscosity 9,700 cps
Gel time: G1>300 mins. (average of two measurements)
G2>300 mins. (average of two measurements)
Accordingly, G2 does not differ significantly from G1.

Example 2

947.0 kg (1730 moles) of Sovermol 908 were introduced into a reactor and dried for 1 hour at 120–140° C./1–5 mbar. After addition of 1.13 kg (3.32 moles) of tetrabutyl orthotitanate, the contents of the reactor were heated to 140° C. in a gentle stream of nitrogen. 187.0 kg (2076 moles) of dimethyl carbonate were then slowly added with stirring and at the same the methanol formed by the reaction at that temperature was distilled off. The total quantity of dimethyl carbonate had been added after about 3.5 hours. The temperature of the reaction mixture was then kept at 140° C. for 0.5 hour and subsequently increased to 200° C. The reaction mixture was then distilled for 1 hour at 200° C., the vapor temperature falling distinctly. Vacuum was then carefully applied and the remaining dimethyl carbonate was removed at 200° C./10–15 mbar. The total quantity of distillate was ca. 150 kg. After cooling to 100° C., the vacuum was eliminated with nitrogen to remove a sample for the purpose of determining viscosity and OH value. The OH value was 50. More Sovermol 908 was then added in a quantity of 38.44 kg, followed by transesterification for 0.5 hour at 200° C. Finally, to deactivate the titanium catalyst, 6.51 kg of a 5% by weight aqueous solution of phosphoric acid were stirred in for 1 hour at 100° C., resulting in vigorous foaming. The product was finally dried in vacuo, giving ca. 1,000 kg of a cloudy, colorless to pale yellowish liquid.

Product parameters:
OH value=55
A value=0.2
Viscosity=30300 cps

Gel time: G1=72.5 mins. (average of two measurements)
G2=61.5 mins. (average of two measurements)
Accordingly, G2 differs from G1 by only 15.2%.

Comparison Example 1a

As Example 1 except that 1 equivalent of an 85% by weight aqueous solution of phosphoric acid was used to deactivate the catalyst.

Gel time: G1>300 mins. (average of two measurements)
G2=90 mins. (average of two measurements)
Accordingly, G2 differs significantly from G1.

Comparison Example 1b

As Example 1 except that 0.3 equivalent of a 1% by weight aqueous solution of phosphoric acid was used to deactivate the catalyst.

Gel time: G1>300 mins. (average of two measurements)
G2=30 mins. (average of two measurements)
Accordingly, G2 differs significantly from G1.

What is claimed is:

1. A process for making OH-terminated compounds comprising:
   (a) combining at least one $CH_2OH$-terminated diol and a titanium-containing catalyst to form a reaction mixture;
   (b) heating the reaction mixture to a temperature of from 110 to 160° C. to form a heated reaction mixture;
   (c) continuously adding dimethyl carbonate to the heated reaction mixture;
   (d) continuously distilling all methanol released from the heated reaction mixture;
   (e) heating the reaction mixture to a temperature of from 190 to 240° C. to form an OH-terminated product;
   (f) removing unreleased methanol and dimethyl carbonate from the reaction mixture under a pressure of less than 100 mbar; and
   (g) deactivating the titanium-containing catalyst by adding from 0.8 to 2 equivalents, based on the catalyst, of a 1 to 20% by weight aqueous solution of phosphoric acid to the reaction mixture, at a temperature of from 80 to 120° C.

2. The process of claim 1 wherein the dimethyl carbonate is continuously added to the heated reaction mixture at a molar ratio of dimethyl carbonate to diol of from 1.01:1 to 5:1.

3. The process of claim 1 further comprising adding additional diol to the OH-terminated product, thereby further transesterifying the OH-terminated product in order to increase the OH value of the OH-terminated product to a desired level, wherein the additional diol is added after the unreleased methanol and dimethyl carbonate from (f) have been removed from the reaction mixture.

4. The process of claim 1 wherein the diol has an average molecular weight Mn of from 118 to 1,000.

5. The process of claim 1 wherein the diol is selected from the group consisting of alkanediols, polyetherdiols, polyesterdiols, and mixtures thereof.

6. A process for making a linear polyurethane comprising reacting the OH-terminated product of claim 1 with a polyisocyanate.

* * * * *